United States Patent
Kwak et al.

(10) Patent No.: US 10,616,835 B2
(45) Date of Patent: Apr. 7, 2020

(54) METHOD FOR CONTROLLING UPLINK TRANSMISSION POWER IN WIRELESS COMMUNICATION SYSTEM, AND APPARATUS THEREFOR

(71) Applicant: LG ELECTRONICS INC., Seoul (KR)

(72) Inventors: Kyuhwan Kwak, Seoul (KR); Yunjung Yi, Seoul (KR); Inkwon Seo, Seoul (KR); Daesung Hwang, Seoul (KR); Suckchel Yang, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/306,495

(22) PCT Filed: Jun. 2, 2017

(86) PCT No.: PCT/KR2017/005787
§ 371 (c)(1),
(2) Date: Nov. 30, 2018

(87) PCT Pub. No.: WO2017/209562
PCT Pub. Date: Dec. 7, 2017

(65) Prior Publication Data
US 2019/0342838 A1 Nov. 7, 2019

Related U.S. Application Data

(60) Provisional application No. 62/417,307, filed on Nov. 3, 2016, provisional application No. 62/373,963, filed
(Continued)

(51) Int. Cl.
*H04W 52/14* (2009.01)
*H04L 5/00* (2006.01)
(Continued)

(52) U.S. Cl.
CPC ......... *H04W 52/146* (2013.01); *H04L 5/0082* (2013.01); *H04L 5/0094* (2013.01);
(Continued)

(58) Field of Classification Search
None
See application file for complete search history.

(56) References Cited

U.S. PATENT DOCUMENTS

2001/0000168 A1 4/2001 Esmailzadeh et al.
2015/0031410 A1 1/2015 Lim et al.
(Continued)

FOREIGN PATENT DOCUMENTS

| KR | 20080113103 | 12/2008 |
|---|---|---|
| KR | 20120061956 | 6/2012 |
| KR | 20150105329 | 9/2015 |

OTHER PUBLICATIONS

PCT International Application No. PCT/KR2017/005787, International Search Report dated Sep. 22, 2017, 4 pages.
(Continued)

*Primary Examiner* — Christine T Duong
(74) *Attorney, Agent, or Firm* — Lee, Hong, Degerman, Kang & Waimey

(57) ABSTRACT

The present invention discloses a method for controlling uplink transmission power in a wireless communication system, and an apparatus therefor. Specifically, the method includes: reporting to a base station, terminal capability information regarding uplink transmission power; receiving from the base station, indication information on the transmission power of a first uplink channel and indication information on the transmission power of a second uplink channel; transmitting the first uplink channel according to the transmission power of the received first uplink channel;
(Continued)

and transmitting the second uplink channel according to the transmission power of the received second uplink channel.

13 Claims, 17 Drawing Sheets

Related U.S. Application Data on Aug. 11, 2016, provisional application No. 62/371,227, filed on Aug. 5, 2016, provisional application No. 62/344,406, filed on Jun. 2, 2016.

(51) Int. Cl.
    *H04L 27/26*     (2006.01)
    *H04W 8/24*     (2009.01)
    *H04W 72/04*     (2009.01)
    *H04W 72/10*     (2009.01)

(52) U.S. Cl.
    CPC .......... *H04L 27/2607* (2013.01); *H04W 8/24* (2013.01); *H04W 72/0413* (2013.01); *H04W 72/0473* (2013.01); *H04W 72/10* (2013.01)

(56) References Cited

U.S. PATENT DOCUMENTS

2015/0063245 A1* 3/2015 Gao ................... H04W 52/346
    370/329
2015/0319724 A1* 11/2015 Chae ................... H04W 8/005
    370/315

OTHER PUBLICATIONS

3rd Generation Partnership Project (3GPP), "Technical Specification Group Radio Access Network; Evolved Universal Terrestrial Radio Access (E-UTRA); Evolved Universal Terrestrial Radio Access (E-UTRA); TDD Home eNode B (HeNB) Radio Frequency (RF) requirements analysis (Release 13)," 3GPP TR 36.922 V13.0.0, Jan. 2016, 75 pages.

European Patent Office Application Serial No. 17807055.3, Search Report dated Jan. 20, 2020, 8 pages.

\* cited by examiner

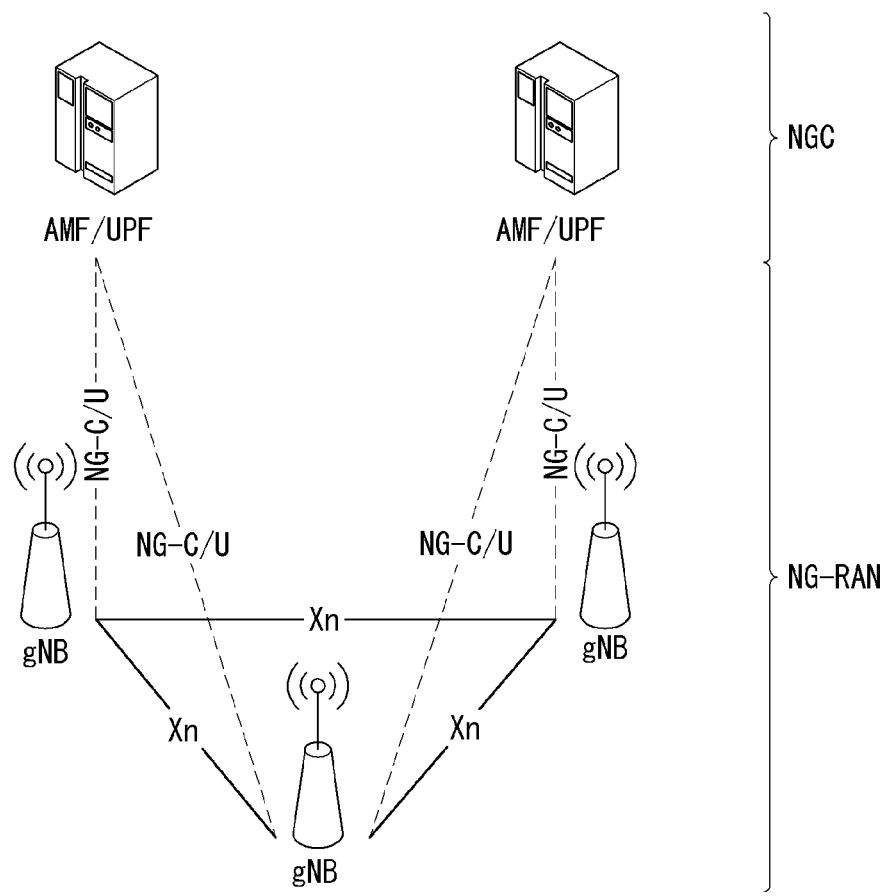
[FIG. 1]

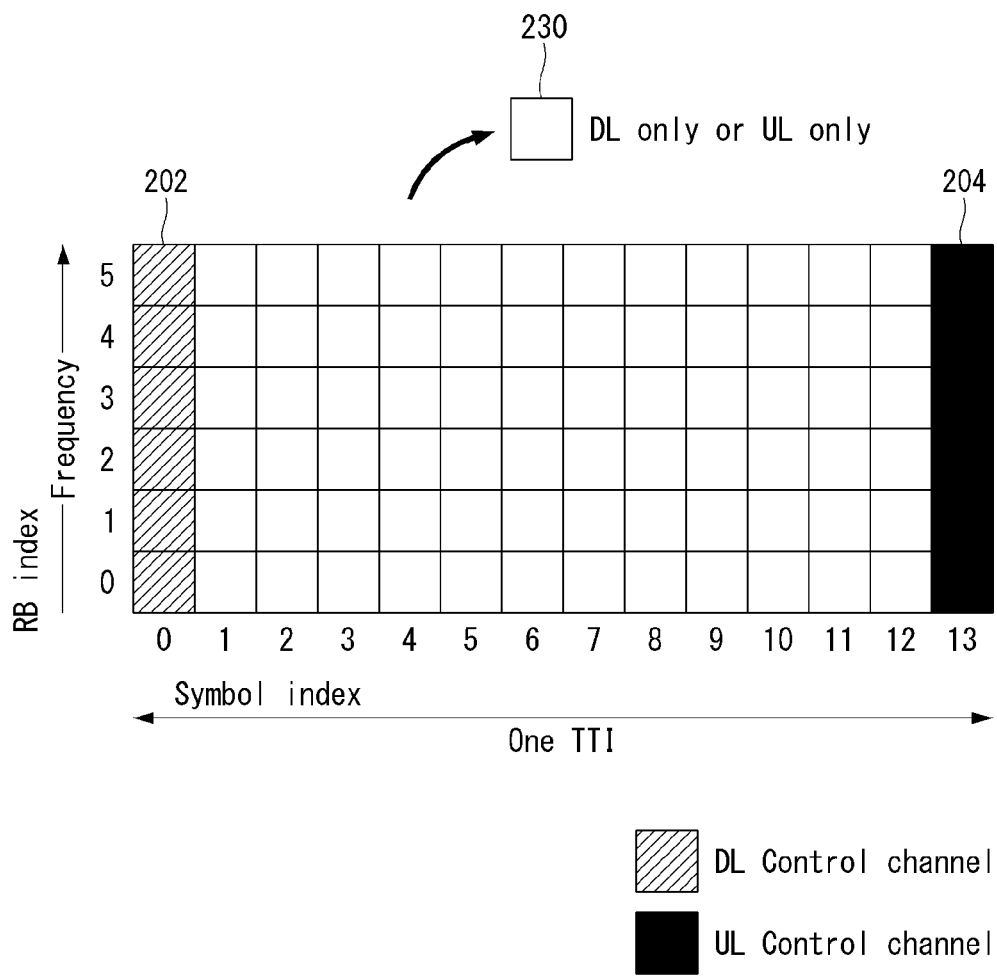
[FIG. 2]

[FIG. 3]
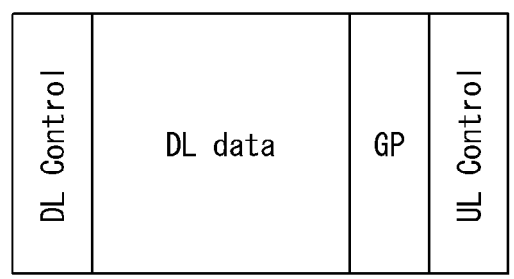
(a)
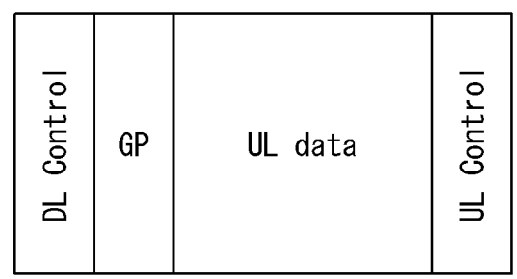
(b)
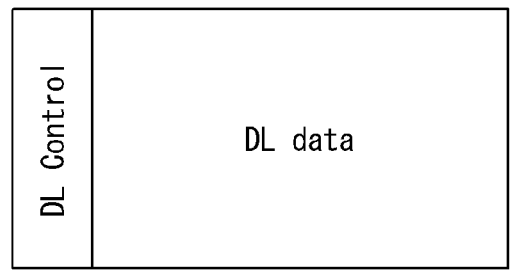
(c)
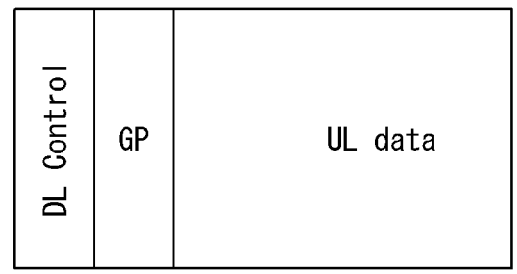
(d)

[FIG. 4]
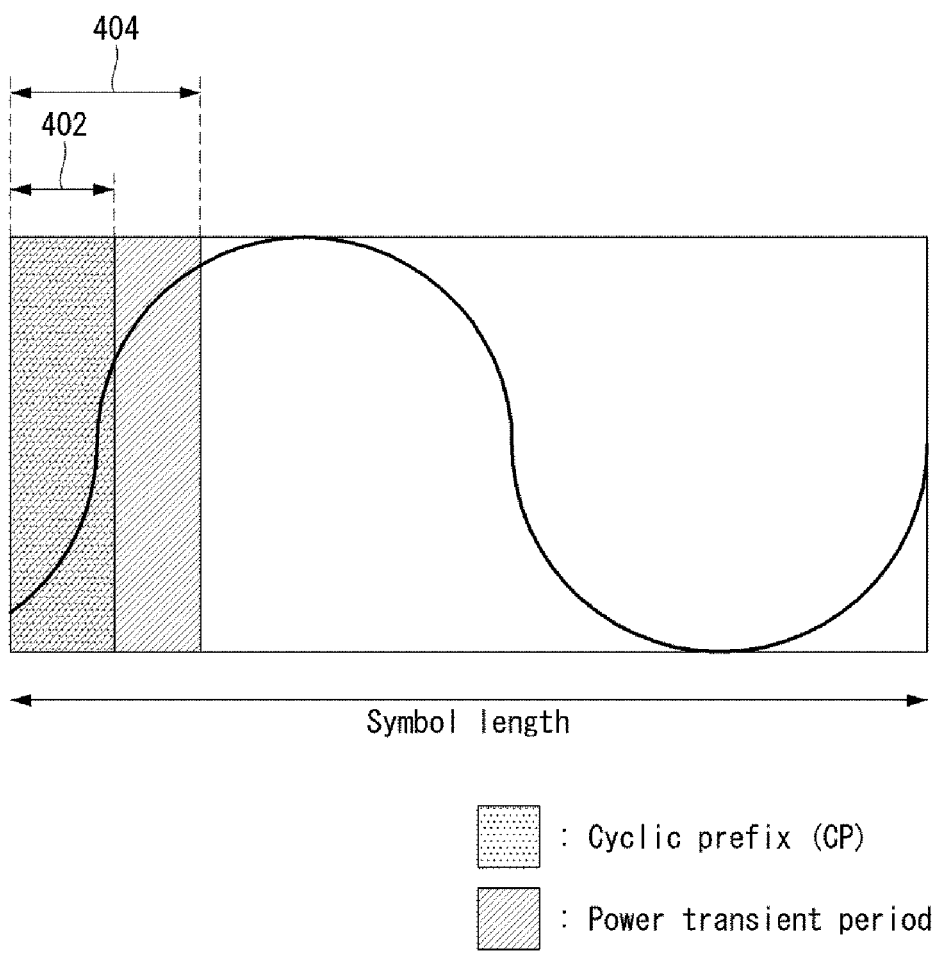

[FIG. 5]
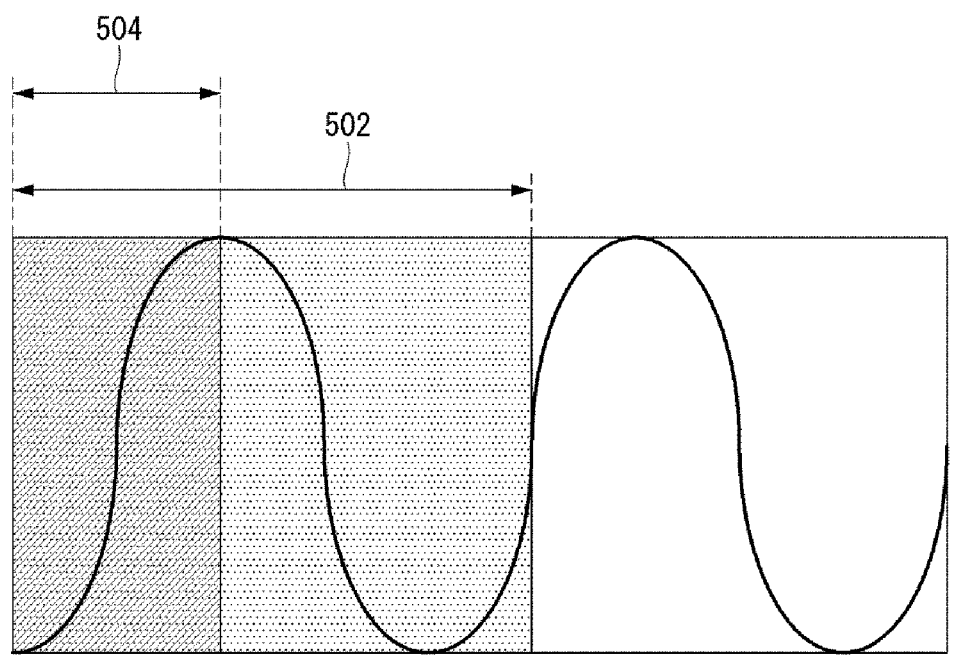

【FIG. 6】
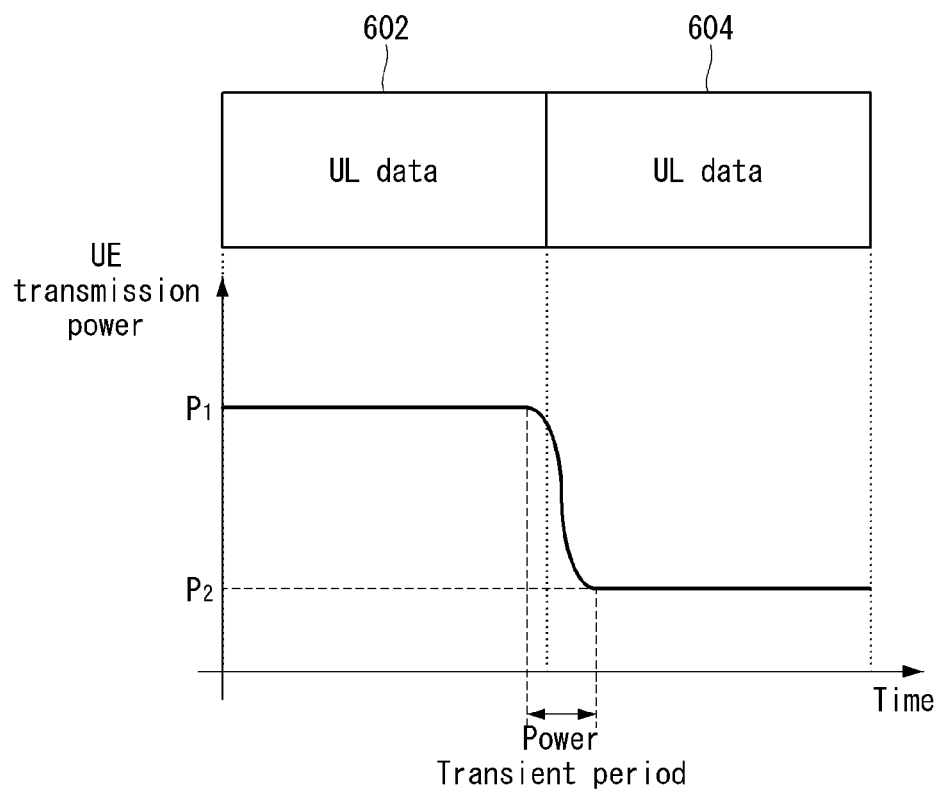

[FIG. 7]
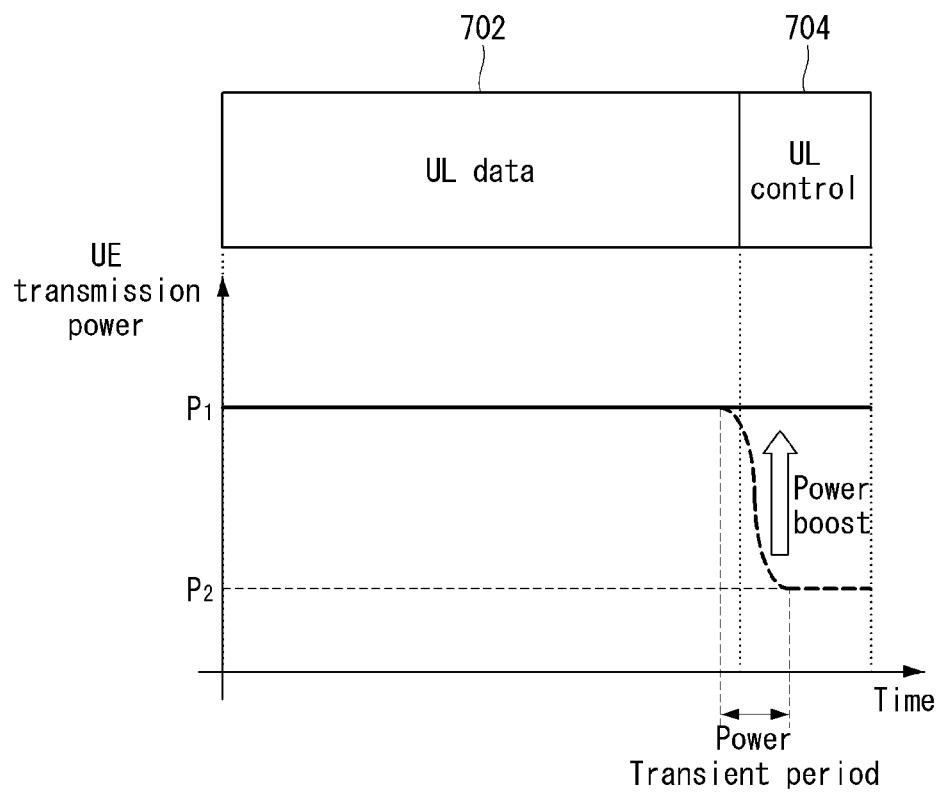

[FIG. 8]
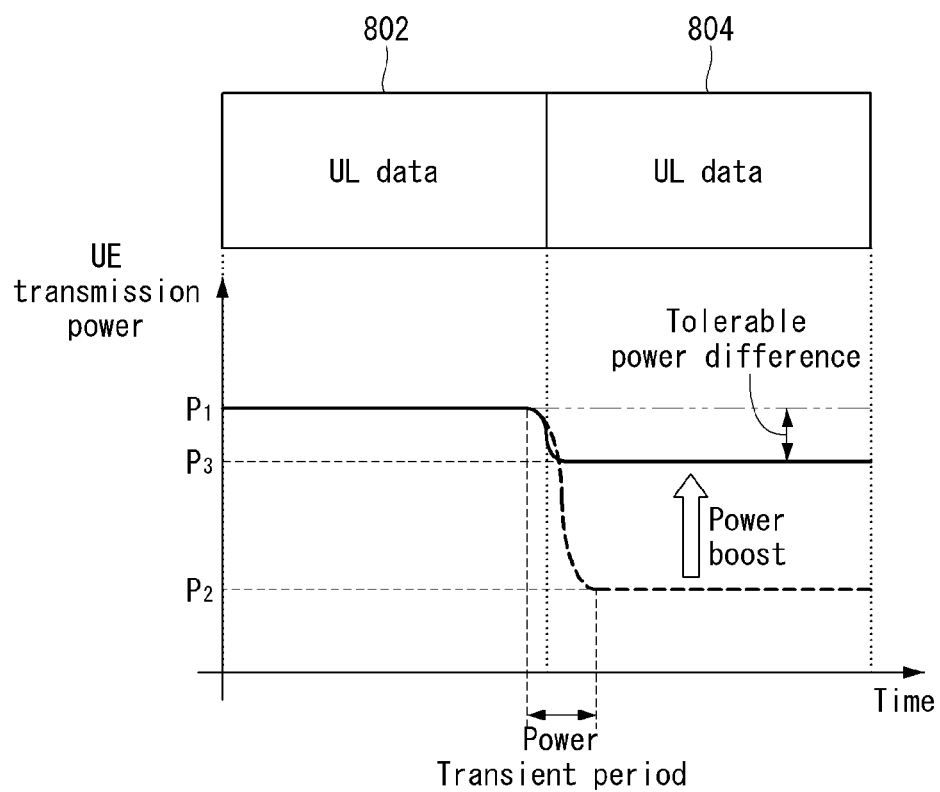

[FIG. 9]
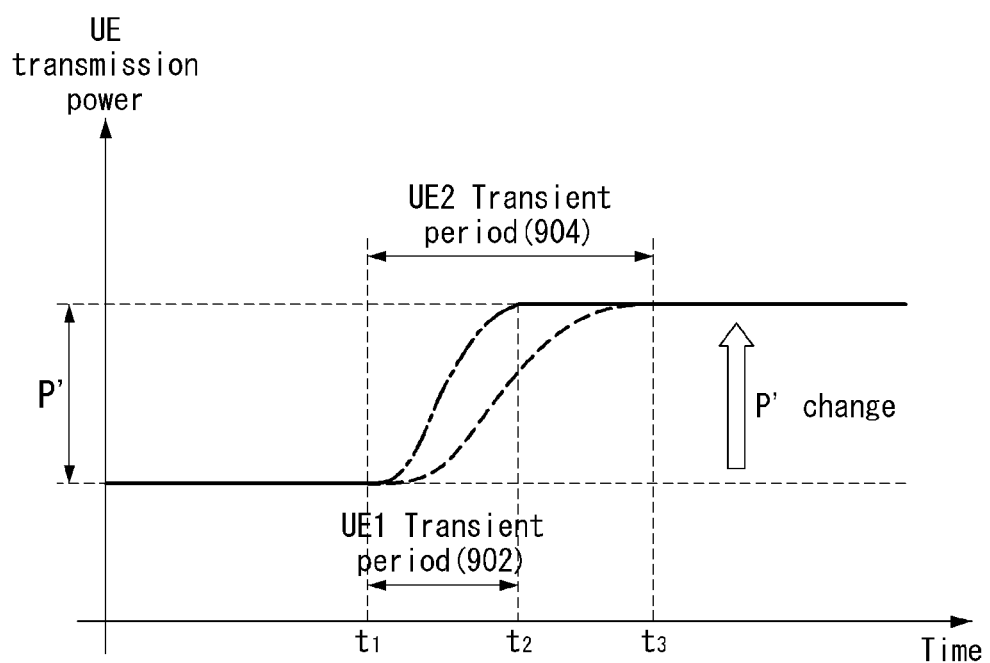

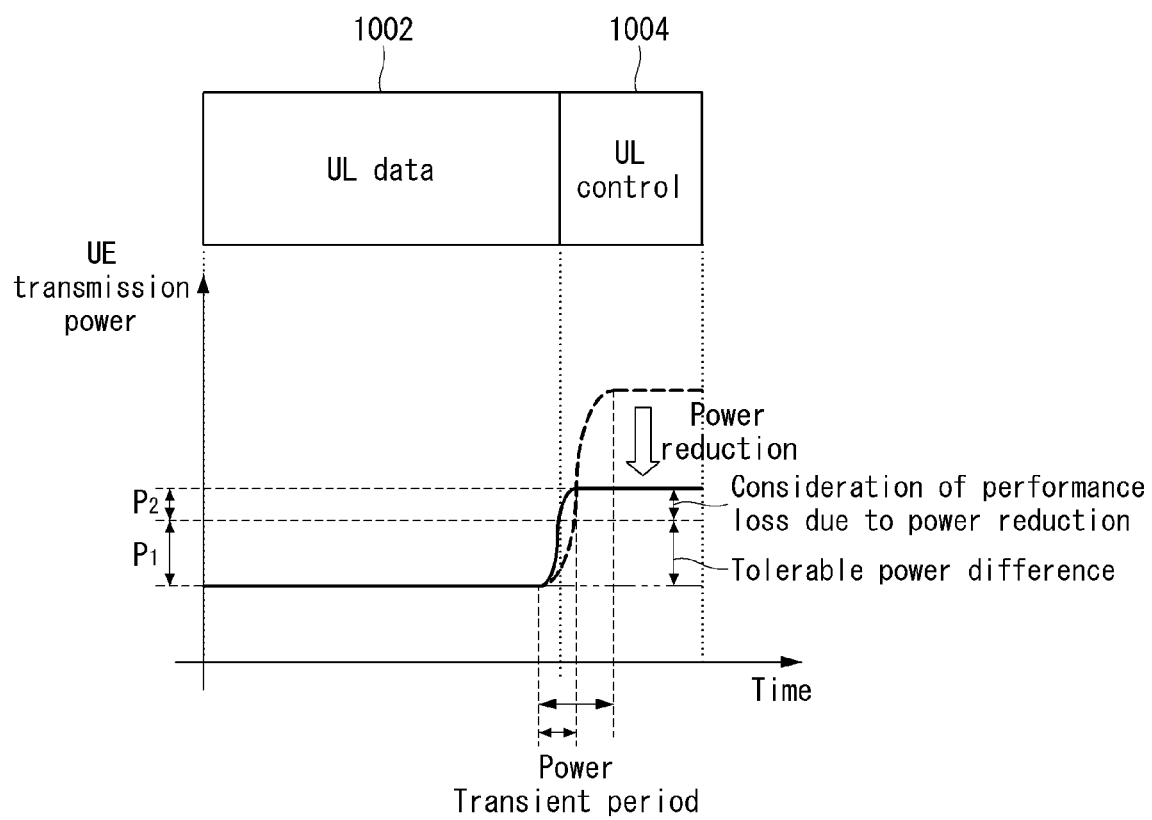
[FIG. 10]

[FIG. 11]
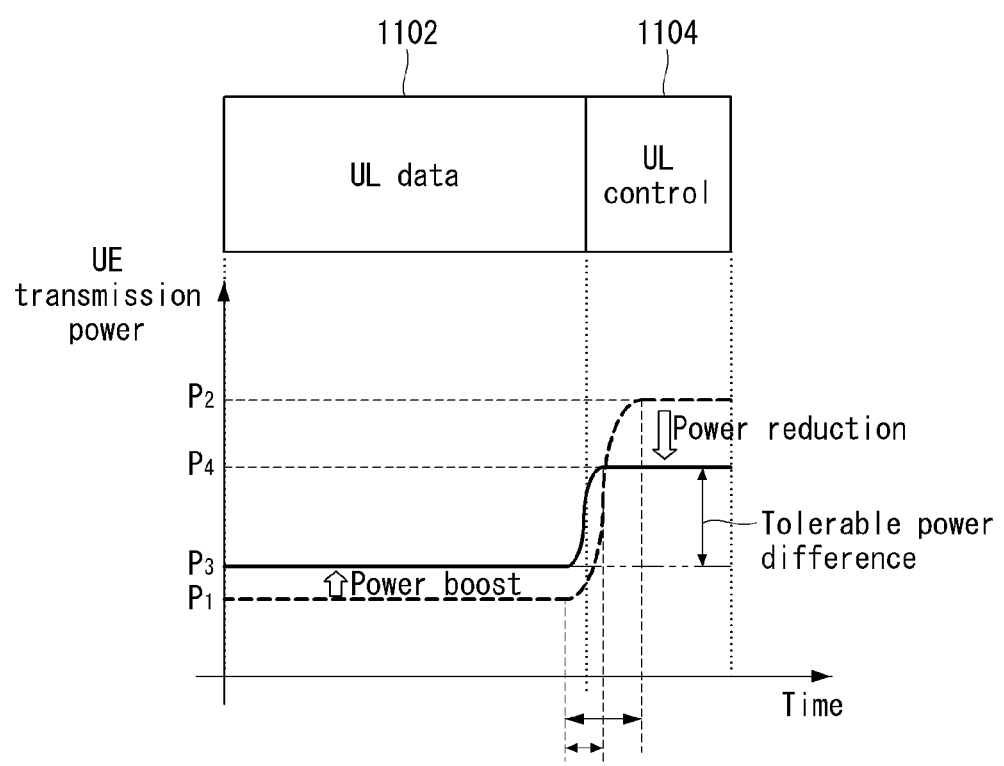

[FIG. 12]
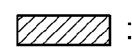: Dummy signal
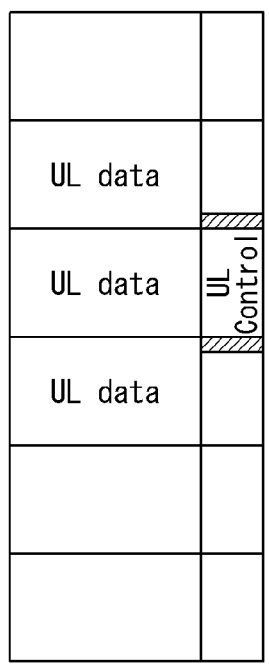
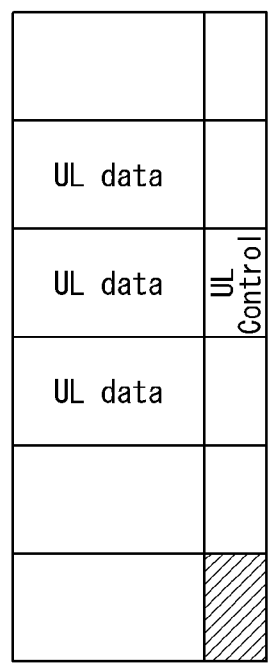
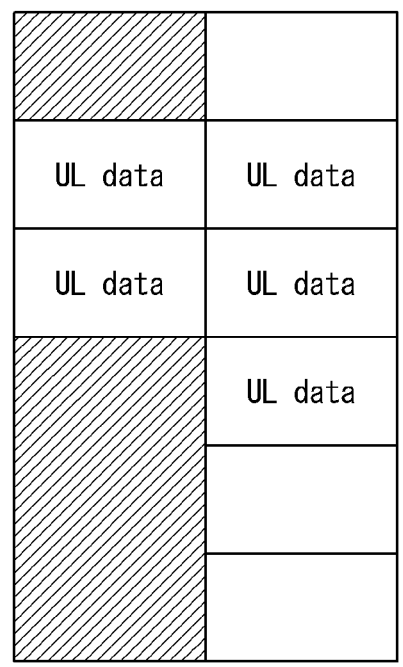
(a)          (b)          (c)

[FIG. 13]
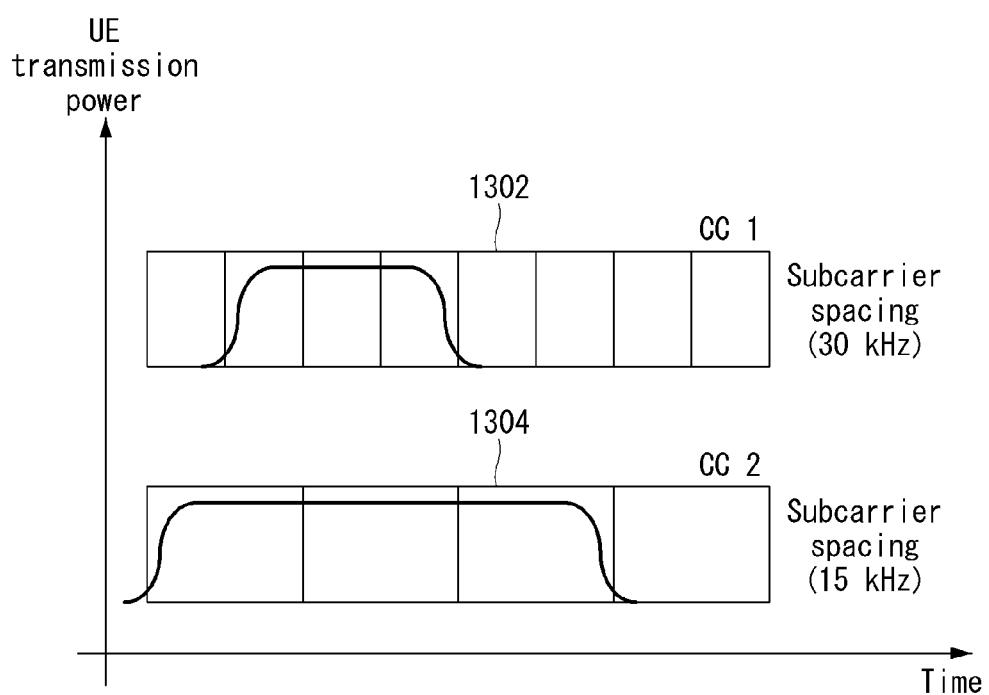

【FIG. 14】
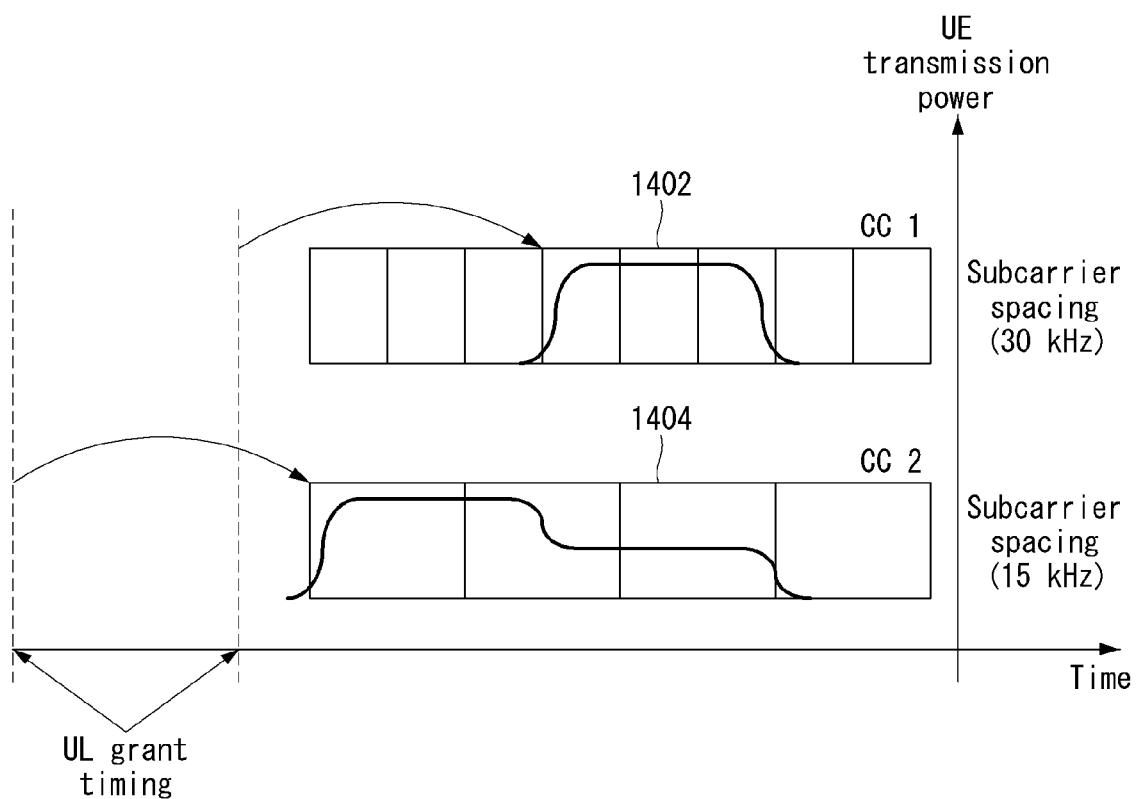

[FIG. 15]
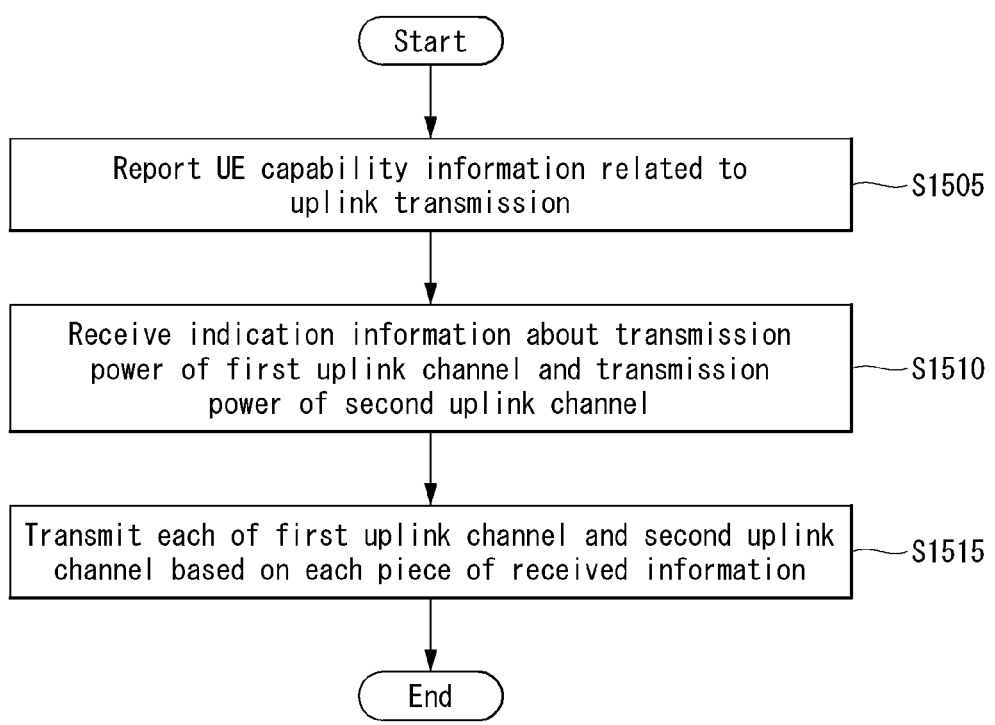

[FIG. 16]
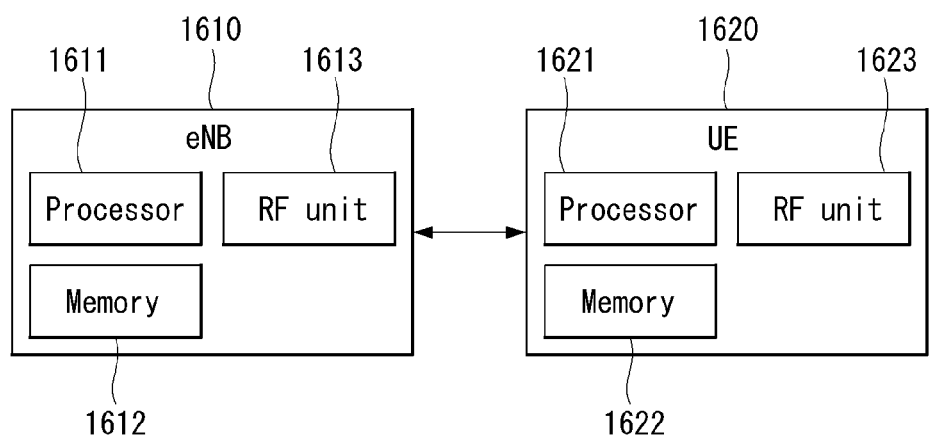

【FIG. 17】
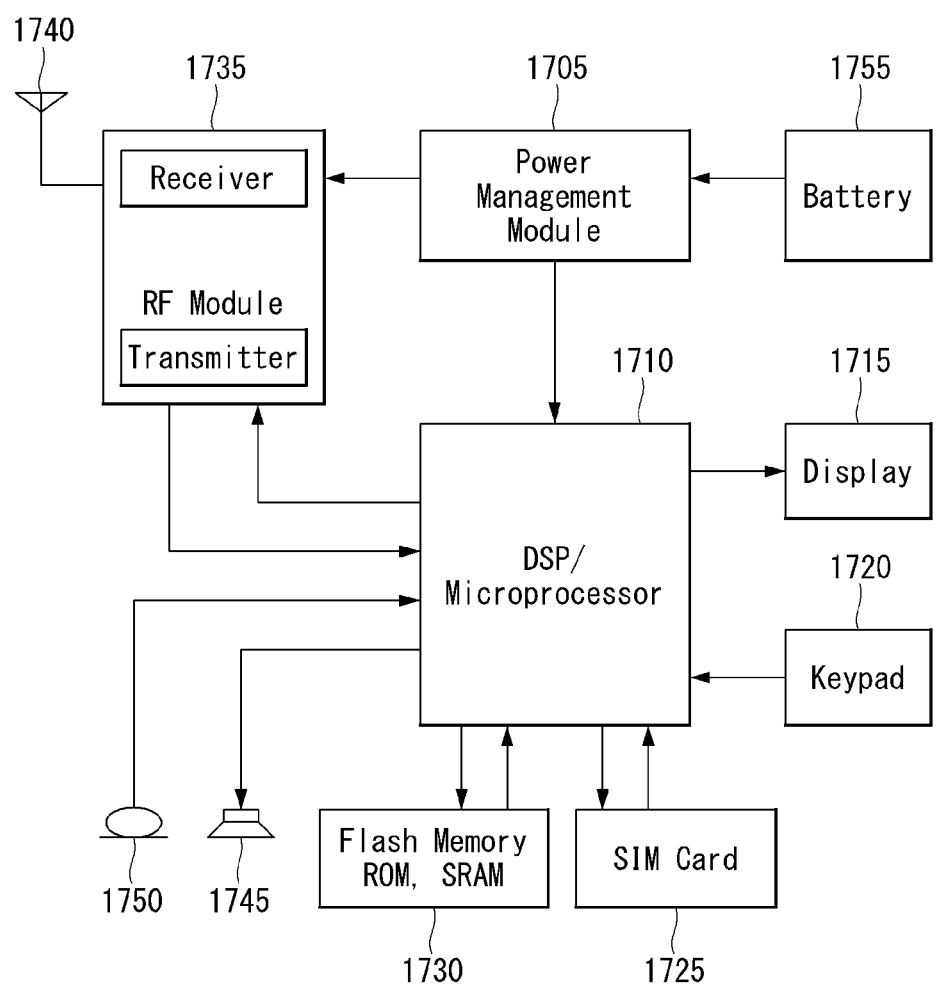

METHOD FOR CONTROLLING UPLINK TRANSMISSION POWER IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/005787, filed on Jun. 2, 2017, which claims the benefit of U.S. Provisional Application Nos. 62/344,406, filed on Jun. 2, 2016, 62/371,227, filed on Aug. 5, 2016, 62/373,963, filed on Aug. 11, 2016, and 62/417,307, filed on Nov. 3, 2016, the contents of which are all hereby incorporated by reference herein in their entirety.

TECHNICAL FIELD

The present invention relates to a wireless communication system and, more particularly, to a method for a user equipment to control uplink transmission power and an apparatus supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DISCLOSURE

Technical Problem

This specification proposes a method of reducing the influence of a power transient period occurring due to pieces of differently configured transmission power when adjacent (i.e., consecutively transmitted) uplink channels are transmitted in relation to a method for a user equipment to control uplink transmission power in a wireless communication system.

More specifically, this specification proposes a method of offsetting the influence of a power transient period by differently configuring a numerology or mapping method with respect to neighbor uplink channels.

Furthermore, this specification proposes a method of minimizing a power transient period by adjusting the power size of one of or both neighbor uplink channels.

Furthermore, this specification proposes a method of minimizing the influence of a power transient period by configuring a power transient period (i.e., by moving a power transient period itself) so that it is generated in any one of neighbor uplink channels or a guard period.

Technical objects to be achieved by the present invention are not limited to the aforementioned technical objects, and other technical objects not described above may be evidently understood by a person having ordinary skill in the art to which the present invention pertains from the following description.

Technical Solution

A method for a user equipment (UE) to control uplink transmission power in a wireless communication system according to an embodiment of the present invention includes reporting, to a base station, UE capability information related to uplink transmission power, receiving, from the base station, indication information for transmission power of a first uplink channel and indication information for transmission power of a second uplink channel in response to the reporting, transmitting the first uplink channel based on the received transmission power of the first uplink channel, and transmitting the second uplink channel based on the received transmission power of the second uplink channel consecutively to the transmission of the first uplink channel. A transient period based on a difference between the transmission power of the first uplink channel and the transmission power of the second uplink channel is configured to be included in any one of a first region in which the first uplink channel is transmitted or a second region in which the second uplink channel is transmitted.

Furthermore, in an embodiment of the present invention, if a guard period (GP) is present between the first region in which the first uplink channel is transmitted and the second region in which the second uplink channel is transmitted, the transient period may be configured to be included in the guard period.

Furthermore, in an embodiment of the present invention, the region in which the transient period is included may be determined based on timing where the power amplifier of the UE operates in an ON state or an OFF state.

Furthermore, in an embodiment of the present invention, if the first uplink channel is an uplink data channel and the second uplink channel is a channel related to initial access, the transient period may be configured to be included in the second region in which the second uplink channel is transmitted.

Furthermore, in an embodiment of the present invention, if priority of the first uplink channel is higher than priority of the second uplink channel by considering preconfigured priority of uplink channels, the transient period is configured to be included in the second region in which the second uplink channel channels.

Furthermore, in an embodiment of the present invention, the preconfigured priority of the uplink channels is configured so that priority of an uplink control channel is higher than priority of an uplink data channel.

Furthermore, in an embodiment of the present invention, if a subcarrier spacing configured for the first uplink channel is larger than a subcarrier spacing configured for the second uplink channel, the transient period may be configured to be included in the second region in which the second uplink channel is transmitted.

Furthermore, in an embodiment of the present invention, if a transmission time interval (TTI) for the first region in which the first uplink channel is transmitted is smaller than a TTI corresponding to the second region in which the second uplink channel is transmitted, the transient period may be configured to be included in the second region in which the second uplink channel is transmitted.

Furthermore, in an embodiment of the present invention, the UE capability information related to the uplink transmission power may include information indicating a tolerable power difference of the UE corresponding to a preconfigured tolerable power transient period.

Furthermore, in an embodiment of the present invention, the information indicating the tolerable power difference of the UE may include information indicating a preconfigured UE category based on the tolerable power difference.

Furthermore, in an embodiment of the present invention, the UE capability information related to the uplink transmission power may include a transient period value required for conversion as much as a preconfigured specific power difference.

Furthermore, in an embodiment of the present invention, if a value for the preconfigured specific power difference is preconfigured as a plurality of values, the UE capability information related to the uplink transmission power may include an average value of transient period values respectively for the plurality of values.

Furthermore, a user equipment controlling uplink transmission power in a wireless communication system according to another embodiment of the present invention includes a transceiver unit for transmitting and receiving radio signals and a processor functionally connected to the transceiver unit. The processor may be configured to report, to a base station, UE capability information related to uplink transmission power, receive, from the base station, indication information for transmission power of a first uplink channel and indication information for transmission power of a second uplink channel, in response to the reporting, transmit the first uplink channel based on the received transmission power of the first uplink channel, and transmit the second uplink channel based on the received transmission power of the second uplink channel, consecutively to the transmission of the first uplink channel, and wherein a transient period based on a difference between the transmission power of the first uplink channel and the transmission power of the second uplink channel is configured to be included in any one of a first region in which the first uplink channel is transmitted or a second region in which the second uplink channel is transmitted.

Advantageous Effects

In accordance with an embodiment of the present invention, a sudden change in transmission power which may occur in a structure supporting a transmission time interval of a short length or a self-contained subframe structure can be effectively processed.

Furthermore, in accordance with an embodiment of the present invention, the influence of signal distortion and/or interference attributable to a power transient period necessary due to a change in transmission power can be minimized.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

FIG. 1 is a diagram illustrating an example of a general system configuration of a new RAT (NR) to which a method proposed in this specification may be applied.

FIG. 2 illustrates an example of a self-contained subframe structure to which a method proposed in this specification may be applied.

FIG. 3 illustrates examples of a self-contained subframe structure to which a method proposed in this specification may be applied.

FIG. 4 illustrates an example in which a power transient period influences a channel configured in a 1 symbol unit.

FIG. 5 illustrates an example in which a specific symbol according to an embodiment of the present invention is used as a cyclic prefix (CP) period.

FIG. 6 illustrates an example in which a power transient period occurs in uplink transmission.

FIG. 7 illustrates an example of a method of offsetting a transmission power period by identically configuring power between channels according to another embodiment of the present invention.

FIG. 8 illustrates an example of a method of configuring a power difference between channels as a tolerable level according to yet another embodiment of the present invention.

FIG. 9 illustrates an example of the power transient periods of UEs necessary for specific power change according to various embodiments of the present invention.

FIG. 10 illustrates an example of a power transient period when a performance loss attributable to a power reduction has been considered according to various embodiments of the present invention.

FIG. 11 illustrates an example of a power transient period configured by controlling power of neighbor channels on both sides according to various embodiments of the present invention.

FIG. 12 illustrates examples of a method of transmitting a dummy signal for power adjustment between channels according to various embodiments of the present invention.

FIG. 13 illustrates an example of a carrier aggregation (CA) to which a different numerology has been applied for each component carrier (CC) according to various embodiments of the present invention.

FIG. 14 illustrates an example in which transmission power of a specific CC influences transmission power of a different CC according to various embodiments of the present invention.

FIG. 15 illustrates a flowchart of an operation of a UE controlling uplink transmission power to which a method proposed in the present invention may be applied.

FIG. 16 illustrates a block diagram of a wireless communication apparatus to which methods proposed in this specification may be applied.

FIG. 17 illustrates a block diagram of a communication apparatus according to an embodiment of the present invention.

MODE FOR INVENTION

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A/New RAT (NR) is primarily described for clear description, but technical features of the present invention are not limited thereto.

As the supply of smartphones and Internet of Things (IoT) UEs is rapidly spread, the amount of information exchanged over a communication network is explosively increased. Accordingly, in a next-generation radio access technology, an environment (e.g., enhanced mobile broadband communication) that provides users with faster services than the existing communication system (or existing radio access technology) may need to be taken into consideration. To this end, the design of a communication system in which machine type communication (MTC) providing services by connecting multiple devices and objects is also taken into consideration.

Furthermore, the design of a communication system (e.g., ultra-reliable and low latency communication URLLC) in which reliability of communication and/or service and/or a terminal, etc. sensitive to latency is taken into consideration is also discussed.

In the following specification, for convenience of description, a next-generation radio access technology is referred to as a new RAT (NR, radio access technology). A wireless communication system to which the NR is applied is referred to as an NR system.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an $X_n$ interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerologies and Frame Structure

In the NR, a plurality of numerologies is supported. The numerology is defined by a subcarrier spacing and CP overhead. A plurality of subcarrier spacings may be derived by scaling a basic subcarrier spacing by an integer N. A numerology used may be selected independently of a frequency band although it is assumed that a very low subcarrier spacing is not used in a very high carrier frequency. In this case, a flexible network and a UE channel bandwidth are supported.

In the RAN1 spec. viewpoint, a maximum channel bandwidth per NR carrier is 400 MHz. In the case of at least one numerology, the candidates of a maximum subcarrier number per NR carrier are 3300 or 6600 in the RAN1 spec. viewpoint.

Subframe duration is fixed to 1 ms, and a frame length is 10 ms. A scalable numerology needs to permit a subcarrier spacing of at least 15 kHz~480 kHz. All numerologies having a great subcarrier spacing of 15 kHz or more regardless of CP overhead are arranged in a symbol boundary for each 1 ms of an NR carrier.

More specifically, normal CP series are selected as follows.

If a subcarrier spacing is 15 kHz*$2^n$ (n is an integer not a negative number), Each symbol length (including a CP) of the 15 kHz subcarrier spacing is identical with the sum of corresponding $2^n$ symbols of a scaled subcarrier spacing.

In each 0.5 ms, all OFDM symbols within 0.5 ms have the same size in addition to the first OFDM symbol.

The first OFDM symbol within 0.5 ms is 16 Ts (assuming 15 kHz and an FFT size of 2048) longer than other OFDM symbols.

16 Ts are used in a CP for the first symbol.

If a subcarrier spacing is 15 kHz*$2^n$ (n is a negative integer)

Each symbol length (including a CP) of the subcarrier spacing is the same as the sum of corresponding $2^n$ symbols of 15 kHz.

A resource defined by one subcarrier and one symbol is called a resource element (RE).

A physical layer design supports an extended CP. The extended CP is only one in a given subcarrier spacing. An LTE-scaled extended CP is supported in at least 60 kHz subcarrier spacing. A CP type may be semi-statically configured using UE-specific signaling. A UE supporting an extended CP may depend on a UE type/capability.

The number of subcarriers per PRB is 12. An explicit DC subcarrier is not reserved for both the downlink and uplink. Regarding a DC present within a transmitter, DC processing of a DC subcarrier on the transmitter side is regulated as follows.

A receiver is aware of where a DC subcarrier is placed or whether the location of a DC subcarrier is notified (e.g., by spec. or signaling) or aware of whether a DC subcarrier is not present within a receiver bandwidth.

In the case of the downlink, a UE may assume that a DC subcarrier transmitted by the transmitter (gNB) side has been modulated. That is, data is not rate-matched or punctured.

In the case of the uplink, a DC subcarrier transmitted by the transmitter (UE) side is modulated. That is, data is not rate-matched or punctured.

In the case of the uplink, the transmitter DC subcarrier of the transmitter (UE) side needs to avoid a collision against at least DMRS.

At least one specific subcarrier needs to be defined as the candidate location of a DC subcarrier with respect to the uplink. For example, the DC subcarrier is positioned at the boundary of a PRB.

In the case of the uplink, means for allowing a receiver to determine a DC subcarrier position needs to be designated.

This is associated with a DC subcarrier position written in semi-static signaling from a UE and the standard.

If a DC subcarrier is not present, all subcarriers within a receiver bandwidth are transmitted.

In contrast, on the receiver side, special handling of a DC subcarrier has not been regulated in RAN1 on the receiver side. An operation needs to be implemented. That is, for example, the receiver may puncture data received in a DC subcarrier.

A slot is defined as 7 or 14 OFDM symbols with respect to the same subcarrier spacing up to 60 kHz having a normal CP and as 14 OFDM symbols at the same subcarrier spacing higher than 60 kHz having a normal CP.

A slot may include all downlinks, all uplinks or at least one downlink portion and at least one uplink portion. A slot set is supported. That is, data transmission may be scheduled as one or a plurality of slot spacings.

Furthermore, a mini-slot having the following length is defined.

A mini-slot having at least 6 GHz or more, length 1 symbol is supported.

Lengths from a length 2 to a slot length −1

In the case of URLLC, at least two are supported.

When a slot level channel/signal/procedure is designed, the followings need to be considered.

The possible occurrence of a mini-slot/slot transmission (s) that occupies resources scheduled for the on-going slot transmission(s) of a given carrier with respect to the same/different UEs At least one of DMRS formats/structures/configurations for a slot level data channel is reused for a mini-slot level data channel.

At least one of DL control channel formats/structures/configurations for slot level data scheduling is designed to be applied to mini-slot level data scheduling.

At least one of UL control channel formats/structures/configurations for slot level UCI feedback is designed to be applied to mini-slot level UCI feedback.

The following use case for designing a mini-slot is considered.

Support of a very low latency time including an URLLC with respect to a specific slot length.

A target slot length is at least 1 ms, 0.5 ms.

In particular, if a TXRP uses beam-sweeping (e.g., 6 GHz or more), a finer TDM granularity for the same or different UE within a slot is supported.

NR-LTE co-existence

Forward compatibility for an unlicensed spectrum operation

Self-contained Subframe Structure

A time division duplexing (TDD) structure considered in an NR system is a structure in which both uplink (UL) and downlink (DL) are processed in one subframe. This is for minimizing latency of data transmission in the TDD system, and the structure is called a self-contained subframe structure.

FIG. 2 illustrates an example of a self-contained subframe structure to which the method proposed by the present invention may be applied. FIG. 2 is only for convenience of description and does not limit the scope of the present invention.

Referring to FIG. 2, as in the case of legacy LTE, a case where one subframe includes 14 orthogonal frequency division multiplexing (OFDM) symbols is assumed.

In FIG. 2, a region 202 means a downlink control region, and a region 204 means an uplink control region. Furthermore, a region (i.e., region not having separate indication) other than the region 202 and the region 204 may be used for the transmission of downlink data or uplink data.

That is, uplink control information and downlink control information are transmitted in one self-contained subframe. In contrast, in the case of data, uplink data or downlink data is transmitted in one self-contained subframe.

If the structure shown in FIG. 2 is used, downlink transmission and uplink transmission are sequentially performed and the transmission of downlink data and the reception of uplink ACK/NACK may be performed within one self-contained subframe.

As a result, when an error in data transmission occurs, the time taken up to the retransmission of data can be reduced. Accordingly, latency related to data delivery can be minimized.

In a self-contained subframe structure such as FIG. 2, there is a need for a time gap for a process for a base station (eNodeB, eNB, gNB) and/or a terminal (user equipment (UE)) to switch from a transmission mode to a reception mode or from the reception mode to the transmission mode. In relation to the time gap, if uplink transmission is performed after downlink transmission in the self-contained subframe, some OFDM symbol(s) may be configured as a guard period (GP).

Furthermore, in the NR system, a plurality of types of self contained subframe structures may be considered in addition to the structure shown in FIG. 2.

FIG. 3 illustrates examples of a self-contained subframe structure to which a method proposed in this specification may be applied. FIG. 3 is only for convenience of description and does not limit the scope of the present invention.

As in FIGS. 3(a) to 3(d), a self-contained subframe in the NR system may have various combinations using a downlink (DL) control region, a downlink (DL) data region, a guard period (GP), an uplink (UL) control region and/or an uplink (UL) data region as one unit.

In the case of the NR system, in order to minimize the latency of control information and/or data transmission, a self-contained subframe structure and/or a structure (i.e., a short TTI structure) in which a short transmission time interval (short TTI) has been configured may be considered. Accordingly, the system can be configured more flexibly.

However, in order to transmit control information and/or data, a transmitter typically requires a specific time for turning on or turning off output power. In other words, the turn-on or turn-off of output power of the transmitter cannot be immediately performed. Accordingly, a transient period for the turn-on or turn-off operation is necessary. In this case, the transient period may be called a power transient period.

In this case, in the case of uplink transmission, a power difference between consecutive subframes and/or consecutive channels may occur depending on the type of a physical layer channel (or signal) and/or the quantity of information allocated to a corresponding resource region.

In particular, in an NR system supporting a flexible subframe structure, as a short resource allocation unit is supported, a case where a change in transmission power, such as that described above, occurs suddenly may occur more frequently.

Accordingly, this specification proposes a method of minimizing a distortion phenomenon which may occur due to a sudden change in transmission power for uplink transmission. Specifically, this specification proposes a method of processing the above-described power transient period in order to minimize the distortion phenomenon of uplink-transmitted information.

The following embodiments are divided only for convenience of description, and some configurations or characteristics of any embodiment may be included in another embodiment or a configuration or characteristic corresponding to another embodiment may be replaced. For example, contents related to the reporting of a UE described in a second embodiment hereafter may be identically applied to a first embodiment or a third embodiment. For another example, the first embodiment, the second embodiment, and the third embodiment may be combined and applied hereinafter.

First Embodiment—Method of Absorbing Power Change Upon Uplink Transmission

In the case of a subframe structure (e.g., a self-contained subframe, a subframe supporting a short TTI) in the above-described NR system, a case where a channel (e.g., physical uplink channel) is configured as 1 symbol may be considered.

For example, as in FIG. 2 or FIG. 3(b) (i.e., a subframe including a downlink control region—GP—an uplink data region—a uplink control region), the uplink control channel (i.e., uplink control region) may include 1 symbol.

In this case, when there is a difference between power necessary for the uplink data channel and power necessary for the uplink control channel, a power transient period may occur as uplink data channel transmission changes to uplink control channel transmission.

Accordingly, as in FIG. 4, transmission performance of the uplink control channel may be severely degraded due to the power transient period.

FIG. 4 illustrates an example in which a power transient period influences a channel configured in a 1 symbol unit. FIG. 4 is only for convenience of description and does not limit the scope of the present invention.

Referring to FIG. 4, a case where a specific uplink channel (e.g., uplink control channel) is configured in 1 symbol unit is assumed. An interval 402 means the CP interval, and an interval 404 means a power transient period.

If the power transient period is configured longer than the CP interval as in FIG. 4, the region in which information is actually transmitted is affected by the power transient period. In other words, since the CP interval does not fully absorb a change in transmission power, a distortion phenomenon for the transmission of actual information may occur.

In order to solve the above-described problem, a method of minimizing the influence of a power transient period by differently configuring a numerology (e.g., subcarrier spacing) between neighbor channels (e.g., an uplink control channel and an uplink data channel) may be considered. In this case, it is evident that the method may be applied regardless of the type (or category) of channel.

For example, if the subcarrier spacing of an uplink control channel is doubly configured compared to the subcarrier spacing of an uplink data channel, the symbol interval (i.e., symbol length) of the uplink control channel is reduced by half.

In this case, a UE may transmit 2 symbols configured as a short interval in the length of an interval corresponding to 1 symbol as the existing subcarrier spacing (i.e., a subcarrier spacing before the subcarrier spacing is doubly configured). Accordingly, as in FIG. 5, as one of 2 symbols configured as a short interval is used as a CP interval, the influence of a power transient period can be absorbed.

FIG. 5 illustrates an example in which a specific symbol according to an embodiment of the present invention is used as a cyclic prefix (CP) period. FIG. 5 is only for convenience of description and does not limit the scope of the present invention.

Referring to FIG. 5, compared to the case of FIG. 4, a case where a specific uplink channel (e.g., uplink control channel) is configured as a 2-symbol unit by the adjustment of a subcarrier spacing is assumed. An interval 502 means a CP interval, and an interval 504 means a power transient period.

As in FIG. 5, one (i.e., specific symbol) of shortly configured symbols may be used as the CP interval. Accordingly, the CP interval may be configured as an interval longer than the power transient period.

Accordingly, the power transient period is included within the CP interval, and does not affect a symbol in which the transmission of actual information is performed. That is, a distortion phenomenon for the transmission of actual information does not occur due to the power transient spacing.

In this case, it is evident that the subcarrier spacing may be adjusted in various ways in order to adjust the number of symbols having a short interval.

Furthermore, a method of removing the influence of a power transient period by differently performing subcarrier mapping on a channel in the interval in which the power transient period occurs may be considered instead of the method of differently configuring a numerology as described above. For example, the influence of a power transient period can be removed through a mapping method of a comb structure (i.e., a method of mapping a subcarrier by placing a specific spacing on a frequency region).

Furthermore, in the case of a channel including a plurality of symbols, a method of using a symbol, corresponding to an interval having a great influence of a power transient period, as an extended CP interval of a neighbor symbol may be considered instead of the method of differently configuring a numerology.

Second Embodiment—Method of Minimizing Power Change Upon Uplink Transmission

In uplink transmission, a power transient period may occur due to a difference in the amount of uplink data allocated to regions and/or in channel types (e.g., an uplink control channel and an uplink data channel).

In this case, a case where a power transient period occurs due to a difference in the amount of uplink data may be represented like FIG. 6. A case where a power transient period occurs depending on a channel type may be represented similarly to FIG. 6.

FIG. 6 illustrates an example in which a power transient period occurs in uplink transmission. FIG. 6 is only for convenience of description and does not limit the scope of the present invention.

Referring to FIG. 6, there is assumed a case where a power transient period occurs when a UE consecutively transmits uplink data channels to which the amount of data has been differently allocated.

Specifically, if one subframe includes two uplink data regions and the amount of resources allocated from a base station to a UE with respect to the regions has a great difference, a power transient period may be necessary in a boundary between the uplink data channels.

For example, terminal transmission power (i.e., UE transmission power) may include high transmission power $P_1$ configured in a first uplink data channel 602 to which much data has been allocated and low transmission power $P_2$ configured in a second uplink data channel 604 to which small data has been allocated. Accordingly, there is a need for a power transient period for enabling the UE to lower transmission power from $P_1$ to $P_2$.

Furthermore, the power transient period may be necessary in a boundary between different subframes in addition to a boundary between uplink data channels within one subframe.

If a power transient period occurs in uplink transmission as described above, a method of preventing a power transient period from occurring by transmitting channels based on high power or low power of power necessary for each channel may be considered.

In this case, as described above, the method may be applied to a case where a UE consecutively transmits an uplink data channel and an uplink control channel.

FIG. 7 illustrates an example of a method of offsetting a transmission power period by identically configuring power between channels according to another embodiment of the present invention. FIG. 7 is only for convenience of description and does not limit the scope of the present invention.

Referring to FIG. 7, there is assumed a case where a UE consecutively transmits an uplink data channel 702 and an uplink control channel 704.

In this case, regarding UE transmission power (i.e., UE transmission power), uplink transmission is performed using $P_1$, that is, high power, among transmission power $P_1$ configured in the uplink data channel 702 and transmission power $P_2$ configured in the uplink control channel 704.

Accordingly, a power transient period can be prevented from occurring in the boundary of the uplink data channel and the uplink control channel.

Furthermore, a case where there is a difference in the transmission power between uplink data regions (or channels) through the example and a case where there is a difference in the transmission power between an uplink data region and an uplink control region have been described. The above-described method may be applied to various cases where regions in which power necessary upon transmission (i.e., required transmission power) is different are present.

However, if a UE transmits a channel by adjusting power of a channel having low power necessary upon transmission to the power size of a neighbor channel, a method of adjusting power only up to the degree that a power difference is limited within a specific range instead of adjusting power exactly identically in order to minimize the influence of interference occurring due to increased power may be considered.

In this case, the power difference limited within the specific range may be called a tolerable difference in the size of power (i.e., a tolerable power difference). In this case, the tolerable power difference may be configured (or determined) by considering a power transient period tolerable in a system.

In this case, the power transient period tolerable in the system may be determined by considering the numerology of the corresponding system. For example, a tolerable power transient period may be determined based on the CP length of a symbol used in a corresponding system. Specifically, the tolerable power difference may mean a power difference when the length of a power transient period necessary due to a change in the transmission power of a UE is shorter than a CP length (i.e., a tolerable power transient period).

FIG. 8 illustrates an example of a method of configuring a power difference between channels as a tolerable level according to yet another embodiment of the present invention. FIG. 8 is only for convenience of description and does not limit the scope of the present invention.

Referring to FIG. 8, there is assumed a case where a power transient period occurs when a UE consecutively transmits uplink data channels (first uplink data channel 802 and second uplink data channel 804) to which the amount of data has been differently allocated.

In this case, in order to minimize the influence of a power transient period in a UE and the influence of interference attributable to a power boost, a difference between terminal transmission power (i.e., UE transmission power) for the first uplink data channel 802 and UE transmission power for the second uplink data channel 804 may be configured as a tolerable power difference (i.e., $P_1$-$P_3$). To this end, the UE transmission power for the second uplink data channel 804 needs to rise from $P_2$ to $P_3$.

In this case, a power transient period changed according to the transmission power boost for the second uplink data channel may mean a power transient period tolerable in a system.

As described above, in order for a UE to perform uplink transmission using transmission power configured based on a tolerable power difference, the UE needs to receive information (or indication information) about transmission power of each uplink channel from a base station.

In this case, the transmission power of each uplink channel is determined by the base station. In order to determine the transmission power of each uplink channel, the base station needs to receive reporting on information about a tolerable power difference related to a UE from the corresponding UE.

In this case, the UE (or user) may determine (or identify) the size of power that may be converted by the UE during a power transient period tolerable in a corresponding system, and may notify the base station of its own tolerable power difference by reporting a value, corresponding to the size of power, to the base station. That is, the UE may report its own UE capability information related to uplink transmission power to the base station.

Such a method may also be applied to a carrier aggregation (CA) environment. Furthermore, if a different numerology is used for each component carrier (CC) in the CA environment, the above-described method may be applied to for each CC.

Furthermore, the UE may report information about a UE category defined in a system to the base station instead of directly reporting (or notifying) the tolerable power difference as described above.

In this case, the UE category may mean a value classified by dividing a tolerable power difference in a specific range unit. Accordingly, the amount of information reported from the UE to the base station can be reduced. In this case, the classified value may mean an index configured for each group after UEs have been grouped into one or more groups according to a specific criterion.

For example, a UE category for a tolerable power difference (tolerance power, TP) related to a power change between channels may be defined as a format such as Table 1 below.

TABLE 1

| UE category | Tolerance Power (TP) (dB) |
|---|---|
| Category 1 | a ≤ TP < b |
| Category 2 | b ≤ TP < c |
| Category 3 | c ≤ TP < d |
| Category 4 | d ≤ TP < e |
| Category 5 | e ≤ TP < f |
| Category 6 | f ≤ TP < g |
| Category 7 | g ≤ TP < h |
| Category 8 | h ≤ TP < i |

For example, if the tolerable power difference of a UE is "a (e.g., 2.0 dB)" or more to less than "b (e.g., 2.5 dB)", the corresponding UE is classified as a category 1. If the tolerable power difference of a UE is "e (e.g., 4.0 dB)" or more to less than "f (e.g., 4.5 dB)", the corresponding UE is classified as a category 5. In this case, a base station may instruct the UE, corresponding to the category 1, to operate based on "a", and may instruct the UE, corresponding to the category 5, to operate based on "e." That is, the base station may instruct a corresponding UE to operate based on the smallest power difference value that may be approved in a category to which the UE belongs.

Furthermore, a UE may report a power transient period value necessary for a change of a specific power difference to a base station instead of reporting the size of power that may be converted by the UE during a power transient period tolerable in a system to the base station as described above.

FIG. 9 illustrates an example of the power transient periods of UEs necessary for specific power change according to various embodiments of the present invention. FIG. 9 is only for convenience of description and does not limit the scope of the present invention.

FIG. 9 assumes a case where different power transient periods are necessary in order for UEs to perform conversion corresponding to a specific power difference (i.e., specific power P'). In general, a power transient period necessary for specific power change may be configured in each UE depending on the capability of the UE. In this case, P' may mean a representative value set (i.e., defined in the system) to perform reporting related to transmission power allocation with respect to a base station.

A first UE (i.e., UE1) requires a UE1 power transient period 902 corresponding to $t_2-t_1$ in order to change power of P'. Unlike this, a second UE (i.e., UE2) requires a UE1 power transient period 904 corresponding to $t_3-t_1$ in order to change power of P'.

Accordingly, if a specific power difference value (i.e., a representative value) has been set as P', in order for each UE to transmit information about its own tolerable power change to a base station, the first UE may report the $t_2-t_1$ value to the base station, and the second UE may report the $t_3-t_1$ value to the base station.

In this case, the specific power difference (i.e., representative value defined in a system) may be configured in plural number in the system. That is, a plurality of representative values, such as a first representative value (e.g., 2 dB), a second representative value (e.g., 4 dB) and a third representative value (e.g., 6 dB), may be present in one system.

In this case, the UE may report all the power transient period values of the plurality of respective configured representative values to the base station. Alternatively, the UE may calculate an average of the power transient period values of the plurality of representative values, and may report only the calculated average value to the base station. For example, if a specific UE requires 10 us with respect to a first representative value, 20 us with respect to a second representative value, and 40 us with respect to a third representative value, the specific UE may report an average value (i.e., 70/3 us) of 10 us, 20 us, and 40 us to a base station.

Furthermore, in relation to the contents that a UE reports a UE category defined in a system to a base station among the above-described contents, the corresponding UE category may mean a value classified by dividing a power transient period value necessary for a UE to perform conversion corresponding to a specific power difference by a specific range.

For example, a UE category classified based on a power transient period value necessary for a change of a specific power difference may be defined as a format such as Table 2 below.

TABLE 2

| UE category | Power transient period (power difference P') (us) |
|---|---|
| Category 1 | a ≤ TP < b |
| Category 2 | b ≤ TP < c |
| Category 3 | c ≤ TP < d |
| Category 4 | d ≤ TP < e |

For example, if a power transient period value for a change of a specific power difference P' is "a (e.g., 10 us)"

or more to less than "b (e.g., 15 us)", a corresponding UE may correspond to the category 1. If a power transient period value for a change of a specific power difference P' is "c (e.g., 20 us)" or more to less than "d (e.g., 30 us)", a corresponding UE may correspond to the category 3.

In order to minimize the influence of a power transient period according to a power change as described above, a UE may raise power of a channel that requires low transmission power based on power of a channel that requires high transmission power.

In contrast, the UE may lower power of a channel that requires high transmission power based on a channel that requires low transmission power. That is, a method for a UE to lower power of a channel that requires high power necessary upon transmission based on the power size of a neighbor channel and to transmit a channel may be considered.

In this case, a method for the UE to lower power so that a power change of a tolerable power difference determined by considering a power transient period tolerable in a system occurs may be considered. In this case, a base station may adjust power by considering a distortion (corruption) degree according to the power transient period and a performance loss occurring because the power is lowered.

In other words, as in FIG. 10, a base station may control power by considering a performance loss attributable to a power reduction.

FIG. 10 illustrates an example of a power transient period when a performance loss attributable to a power reduction has been considered according to various embodiments of the present invention. FIG. 10 is only for convenience of description and does not limit the scope of the present invention.

Referring to FIG. 10, a case where a base station controls power for each channel by considering a power transient period necessary for a UE when a power change from an uplink data channel 1002 to an uplink control channel 1004 occurs has been considered.

In FIG. 10, the base station may configure transmission power of the uplink control channel to be $P_2$ larger than a tolerable power difference $P_1$ determined by considering a power transient period tolerable in a system by considering a performance loss attributable to a power reduction in the uplink control channel.

In this case, a method for the base station to determine transmission power of each channel based on the above-described reporting method of a UE and to notify a UE of information about the transmission power may be applied.

Furthermore, in order to minimize the influence of a power transient period according to a power change, a method of controlling (or adjusting) power of neighbor channels on both sides by considering a tolerable power difference determined by considering a power transient period tolerable in a system may also be considered in addition to the method of controlling power of a channel on any one side as described above.

FIG. 11 illustrates an example of a power transient period configured by controlling power of neighbor channels on both sides according to various embodiments of the present invention. FIG. 11 is only for convenience of description and does not limit the scope of the present invention.

Referring to FIG. 11, there is assumed a case where a base station performs control so that a UE transmits an uplink channel using a method of raising power of a channel having relatively low power and lowering power of a channel having relatively high power by considering power necessary for a UE to transmit each channel.

In this case, the base station may independently configure the sizes of adjusted power of neighbor channels on both sides or may control power of channels on both sides through a method of setting a specific ratio and identically applying the specific ratio to power adjustment of the channels on both sides.

For example, in FIG. 11, if transmission power of an uplink data channel 1102 is "$P_1$" and transmission power of an uplink control channel 1104 is "$P_2$", a base station may raise the transmission power of the uplink data channel 1102 by "$P_1 \times c$" (i.e., $P_1 + P_1 \times c = P_3$) and lower the transmission power of the uplink control channel 1104 by "$P_2 \times c$" (i.e., $P_2 - P_2 \times c = P_4$) by setting a specific ratio "c." Through such a method, the base station may control power of channels on both sides so that a different (i.e., $P_4 - P_3$) value between $P_4$ and $P_3$ is identical with or smaller than a difference of tolerable power determined by considering a power transient period tolerable in a system.

In this case, the base station may notify a UE of a power adjustment (or control) ratio (i.e., "c") value through higher layer signaling and/or downlink control information (DCI).

Furthermore, as described in FIG. 10, the base station may configure the size of controlled power by considering the degree of a performance loss (or performance influence) according to power adjustment.

In this case, a method for the base station to determine transmission power of each channel based on the above-described reporting method of a UE and to notify a UE of information about the transmission power may be applied.

Furthermore, in various embodiments of the present invention, in addition to the method of adjusting power, if a power difference between an uplink data channel and an uplink control channel that neighbor each other exceeds a tolerable power size configured in a system, a UE may transmit uplink control information (UCI) by piggybacking it to an uplink data region.

Furthermore, in various embodiments of the present invention, a method of adjusting power using a dummy signal may be considered. In this case, the region in which the dummy signal is transmitted may be configured like FIG. 12.

FIG. 12 illustrates examples of a method of transmitting a dummy signal for power adjustment between channels according to various embodiments of the present invention. FIG. 12 is only for convenience of description and does not limit the scope of the present invention.

Referring to FIG. 12, a method of adjusting power using a dummy signal may be applied to a case where a power change according to a difference in the amount of data allocated to neighbor channels or a power change according to a difference between channel categories (or types) occurs.

As in FIG. 12(a), a region in which a dummy signal is transmitted may be mapped in one direction or both directions of resources allocated from a base station to a UE. For example, a UE may transmit a dummy signal using specific frequency bands at both ends of an uplink control channel resource allocated by a base station.

Furthermore, as in FIG. 12(b), a base station may instruct UEs to transmit a dummy signal in a specific resource region by allocating (i.e., configuring) the specific resource region as a dummy signal transmission region.

Furthermore, as in FIG. 12(c), a method for a UE to transmit a dummy signal over a full frequency band to which a resource has not been allocated by a base station instead of a specific resource region may also be considered.

Through the above-described methods, a base station can configure power between neighbor channels (or neighbor uplink channels) identically or with a difference of a tolerable level (i.e., tolerable power difference).

In this case, the amount of resources in which the dummy signal is transmitted may be configured to be adjusted based on a power difference between neighbor channels and/or a UE category. Furthermore, the dummy signal may be transmitted only in one of the neighbor channels or may be transmitted on both neighbor channels.

Furthermore, if a base station configures a specific resource region for dummy signal transmission, the base station may notify a UE of a pool of candidate resource positions. For example, the base station may notify the UE of the specific resource region using a resource block (RB) unit and/or a subcarrier index.

A UE may randomly select some of or the entire resource pool received from a base station, and may transmit a dummy signal. Furthermore, a UE may select some of or the entire resource pool based on a UE ID, and may transmit a dummy signal.

Furthermore, a method for a base station to directly provide notification of a resource in which a dummy signal will be transmitted through downlink control information (DCI) and/or higher layer signaling may also be considered.

If the transmission resource of a dummy signal is configured in a resource block (RB) unit, a UE may place gaps at the edges of a resource block on both sides by considering interference toward a neighbor band, may mapping a dummy signal to the central part of the resource block, and may transmit the dummy signal. That is, since the dummy signal may influence an actual signal (i.e., control information or data) transmitted in a neighbor band, the UE may map the dummy signal to the central part of a specific resource block region and transmit the dummy signal.

In this case, a base station may notify the UE of a configuration related to the above-described gaps through downlink control information (DCI) and/or higher layer signaling. Furthermore, in relation to the mapping of the dummy signal, a method of controlling a symbol in which a demodulation reference signal (DMRS) is transmitted in the neighbor band and mapping the dummy signal may also be considered.

In this case, the dummy signal may be a randomly generated signal, a specific signal selected from a predefined specific signal set, or a signal designated by the base station. In this case, in relation to a case where a specific signal (i.e., dummy signal) is selected from the predefined specific signal set, the UE may randomly select the corresponding specific signal or may select the identity of the UE (i.e., UE ID). Alternatively, the base station may designate a specific signal in the specific signal set with respect to the UE.

Furthermore, a power control (or adjustment) method, such as that described above, may also be applied to a system (or environment) supporting a carrier aggregation (CA).

FIG. 13 illustrates an example of a carrier aggregation (CA) to which a different numerology has been applied for each component carrier (CC) according to various embodiments of the present invention. FIG. 13 is only for convenience of description and does not limit the scope of the present invention.

Referring to FIG. 13, a case where different numerologies have been applied to different CCs is assumed. For example, the subcarrier spacing of a first CC (i.e., CC 1) 1302 is configured as 30 kHz, and the subcarrier spacing of a second CC (i.e., CC 2) 1304 is configured as 15 kHz.

In this case, power may be configured based on a channel (or uplink channel) transmitted in each CC. The above-described methods may be applied to for each CC within the configured power.

In this case, as in the case where a power amplifier is one, a case where transmission power in a different CC influences transmission power in a CC that is previously being transmitted.

FIG. 14 illustrates an example in which transmission power of a specific CC influences transmission power of a different CC according to various embodiments of the present invention. FIG. 14 is only for convenience of description and does not limit the scope of the present invention.

Referring to FIG. 14, as in the case of FIG. 13, the subcarrier spacing of a first CC 1402 is configured as 30 kHz, and the subcarrier spacing of a second CC 1404 is configured as 15 kHz.

In this case, if a UE needs to transmit uplink information through the first CC 1402 while transmitting the uplink information through the second CC 1404 based at timing of an uplink grant, a case where power for transmitting the uplink information through the second CC 1404 has to be changed may occur. Accordingly, an additional power transient period occurs while the uplink information is transmitted. In this case, the above-described power control methods may be applied to the power transient period.

Furthermore, if the size of power that needs to be adjusted in a CC (i.e., the second CC 1404) that is previously being transmitted exceeds a tolerable power difference of a corresponding UE determined by considering a tolerable power transient period of a system, the UE may stop transmission in a CC (i.e., second CC 1404) that is being transmitted based on priority or may drop transmission in a subsequently allocated CC (i.e., second CC 1402). In this case, the priority may be determined (or decided) based on the type of transmission channel.

A scheme for a UE to configure the size of power that may be changed by the UE as tolerable power by considering a power transient period tolerable in a system in the above-described methods may also be performed as another method.

For example, if a UE has to raise the power size of a neighbor channel and to transmit the channel among the above-described methods, a tolerable power conversion size (i.e., tolerable power difference) for a specific UE may be determined (by a base station or the UE) by considering interference between UEs that have accessed the system. Furthermore, if a UE lowers the power size of a neighbor channel and transmits the channel, a tolerable power conversion size for a specific UE may be determined (by a base station or the UE) by considering performance reduced because the power size is reduced.

As described above, if a tolerable power conversion size is given a UE may be aware of (or may identify) its own power transient period necessary to control power as much as a tolerable power conversion size in a corresponding system, and may report the value of the corresponding power transient period to a base station. That is, the UE may report its own UE capability information related to uplink transmission power to the base station.

Furthermore, a UE may report a UE category defined in a system instead of directly reporting the value of a corresponding power transient period as described above. In this case, the UE category may be a value classified by dividing the value of the power transient period in a specific range unit. Accordingly the amount of information reported from a UE to a base station can be reduced.

Third Embodiment—Method of Minimizing Influence of Power Change Upon Uplink Transmission In a subframe structure (i.e., the self-contained subframe structure examples shown in FIG. 3 or a subframe structure supporting a short TTI) supported in an NR system, when a UE changes to uplink transmission after downlink transmission, a power transient period may occur at the starting point of the uplink transmission.

However, if downlink transmission changes to uplink transmission, a guard period (GP) is configured. A power transient period may be configured to be included in the guard period (GP). In other words, a UE may turn ON or OFF a power amplifier in the guard period in order to configure the power transient period in the guard period.

Furthermore, if part of the downlink transmission is transmitted in the guard period (GP) region due to propagation delay and overlaps uplink transmission start timing configured by considering timing advance (TA) and/or a power transient period, any one of the downlink transmission and the uplink transmission may be configured to be dropped based on the priority of the downlink transmission and the uplink transmission. The UE may perform only one of the downlink transmission or the uplink transmission based on such a configuration.

Furthermore, the priority may be configured between the downlink transmission and the uplink transmission and may also be configured with respect to each of uplink channels. For example, in the case of uplink transmission, priority may be configured in order of an uplink control channel region, an uplink data channel region and a guard period. In this case, the power transient period of a UE may be configured so that the power transient period occurs in the uplink data channel region having low priority among the uplink control channel and the uplink data channel.

In this case, a base station may determine (or recognize) whether the downlink transmission and uplink transmission of the UE overlap by receiving reporting on information about a UE category, such as that described above, from the UE. Furthermore, the base station may previously determine priority through content to be transmitted through the downlink and/or content to be received through the uplink.

Furthermore, a method of configuring a guard period (GP) so that it is always present between neighbor regions (i.e., neighbor channel regions) may be considered as a method using a guard period (GP). For example, a structure configured so that a guard period is always present between an uplink data region (i.e., a region in which an uplink data channel is transmitted) and an uplink control region (i.e., a region in which an uplink control channel is transmitted) having a possibility that a different may be present in power (i.e., transmission power) necessary upon transmission may be considered. In this case, a UE may transmit uplink information so that a power transient period occurs in the guard period. That is, the UE may turn ON a power amplifier in the interval.

Furthermore, in various embodiments of the present invention, if regions having different robustness with respect to signal distortion and/or interference neighbor, transmission power of a UE may be configured so that a power transient period occurs in a relatively robust region (i.e., a region less influenced by the signal distortion/interference).

For example, if a data region (i.e., uplink data region) and a region allocated for initial access neighbor, transmission power of a UE may be configured so that a power transient period occurs in the region allocated for initial access. The region allocated for initial access may be more conservatively configured to transmit a preamble having a longer symbol length and to have a longer cyclic prefix (CP) than the data region by making differently a subcarrier spacing unlike the data region. Furthermore, since an additional gap can be placed behind the preamble, the region allocated for initial access is more robust against signal distortion and/or interference than the data region. Due to such a characteristic, if the region allocated for initial access neighbors another region, a UE may position a power transient period in the region allocated for initial access and transmit uplink information and a preamble.

For another example, if regions whose numerologies have been differently configured (e.g., subframes whose numerologies have been differently configured, channel regions whose numerologies have been differently configured) neighbor, transmission power of a UE may be configured so that a power transient period occurs on the side having longer symbol duration (or symbol length). For example, a region whose subcarrier spacing has been configured as 15 kHz is robust against signal distortion and/or interference because it has a symbol length twice longer than the symbol length of a region whose subcarrier spacing has been configured as 30 kHz. Accordingly, a UE may position a power transient period in the region whose subcarrier spacing has been configured as 30 kHz and transmit uplink information.

For another example, if TTIs of different lengths neighbor, transmission power of a UE may be configured so that a power transient period occurs in a TTI having a longer length (i.e., including more symbols). That is, a region having a longer allocation unit of a resource is more robust against signal distortion and/or interference. For example, if a TTI of a 2-symbol unit and a TTI of a 3-symbol unit neighbor, the TTI of a 3-symbol unit is more robust against signal distortion and/or interference. Accordingly, a UE may position a power transient period in the TTI of a 3-symbol unit and transmit uplink information.

Furthermore, in various embodiments of the present invention, a method of changing the position of a power transient period depending on consecutive transmission between neighbor channels within one subframe and/or between neighbor subframes may also be considered. For example, transmission power of a UE may be configured so that the above-described methods are applied when consecutive transmission is performed and a power transient period occurs at the boundary of a transmission channel and/or outside a subframe when consecutive transmission is not performed.

In this case, the method may be randomly applied by a UE. A base station may designate the method with respect to the UE through higher layer signaling and/or downlink control information (DCI).

Furthermore, in various embodiments of the present invention, the influence of a power change can be minimized through a method of mapping a DMRS for channel estimation by avoiding a region where a power transient period may occur. For example, a UE may position one or more symbol spacings in an uplink data region and/or at the edge of the uplink control region, and may map and transmit a DMRS.

Furthermore, in the case of a system in which a TTI is shortly configured, a power transient period itself necessary for a UE to change from an OFF state to an ON state may cause a performance loss. For example, in the case of a system in which a 2-symbol unit TTI is configured, decoding performance of a TTI unit itself may be deteriorated because a power transient period switching from the OFF state to the ON state has an influence in the first symbol and a power transient period switching from the ON state to the OFF state has an influence in the second symbol.

In order to solve such a performance loss, in various embodiments of the present invention, a method of reducing the influence of a power transient period through a method for a system (or base station) to schedule a multi-TTI with respect to UEs may be considered. In this case, the UE may repeatedly transmit the same transport block (TB) in each TTI or may transmit a different transport block (TB) in each TTI.

In this case, the base station may transmit information about a configuration, such as that described above, to the UE through higher layer signaling and/or physical layer signaling.

Furthermore, in various embodiments of the present invention, a method of moving a power transient period (i.e., a power transient period processing method in terms of time) and a method of changing transmission power itself allocated to a channel and processing a power transient period (i.e., a power transient period processing method in terms of the size of power), such as those described above, may be combined and applied depending on the ON/OFF operation of the power amplifier of a UE.

For example, if a guard period (GP) is narrowly configured, a power transient period may not be configured within the guard period by only the ON/OFF operation of the power amplifier of a UE. In this case, additionally, transmission power of the UE may be configured so that the power transient period occurs within the guard period through a method of controlling a power size in one of adjacent regions (i.e., channels) or both the adjacent regions (i.e., channels). That is, the processing of a power transient period can be optimized by combining and applying the two methods.

FIG. 15 illustrates a flowchart of an operation of a UE controlling uplink transmission power to which a method proposed in the present invention may be applied. FIG. 15 is only for convenience of description and does not limit the scope of the present invention.

Referring to FIG. 15, it is assumed that there is a difference in the transmission power of a UE necessary for each channel depending on the category (or type) of uplink channels or a difference in the amount of data allocated to an uplink channel and thus a power transient period is necessary.

At step S1505, a UE reports UE capability information related to uplink transmission to a base station. In this case, the UE capability information related to uplink transmission may include information indicating the tolerable power difference of the UE corresponding to preconfigured tolerable power transient period as described above.

For example, the UE may report a power difference value that may be converted by itself to the base station. Alternatively, the UE may report information indicating a preconfigured UE category to the base station on a system based on the tolerable power difference. In this case, the UE category may be defined like Table 1 or Table 2.

Alternatively, the UE may report a power transient period value necessary for conversion corresponding to a preconfigured specific power difference (e.g., a representative value) on the system. If the specific power difference values are configured in plural number, the UE may report an average value of power transient period values corresponding to the respective representative values.

After the UE reports the UE capability information to the base station, the UE receives indication information for transmission power of a first uplink channel and transmission power of a second uplink channel from the base station at step S1510. In this case, the first uplink channel and the second uplink channel may mean the same uplink channel or may mean different uplink channels (e.g., an uplink data channel and an uplink control channel).

After the UE receives the indication information, the UE transmits each of the first uplink channel and the second uplink channel based on each piece of the received information at step S1515. In this case, the transmission of the second uplink channel is performed consecutively to the transmission of the first uplink channel. For example, the UE may transmit an uplink data channel and an uplink control channel consecutively.

In this case, a transient period (i.e., a power transient period) occurs due to a difference between the transmission power of the first uplink channel and the transmission power of the second uplink channel. In this case, the transient period is configured to be included in the region (i.e., first region) in which the first uplink channel is transmitted or the region (i.e., second region) in which the second uplink channel is transmitted. Furthermore, the region in which the first uplink channel is transmitted may include a time interval (e.g., symbol, slot, subframe) in which the first uplink channel is transmitted, and the region in which the second uplink channel is transmitted may include a time interval in which the second uplink channel is transmitted. In this case, what the transient period is included in any one region may mean that a specific portion (e.g., 90%) or more of the transient period is included in a specific region.

Accordingly, only one of the first uplink channel and the second uplink channel is influenced by the transient period. In this case, the base station may transmit information about such a configuration to the UE through higher layer signaling and/or physical layer signaling.

However, if a guard period (GP) is present between the region in which the first uplink channel is transmitted and the region in which the second uplink channel is transmitted, the transient period may be configured to be included in the guard period not the first uplink channel and the second uplink channel.

In this case, the region including the transient period may be determined based on timing at which the power amplifier of the UE operates in an ON state or an OFF state, that is, timing at which the power amplifier becomes ON or OFF. That is, when the power amplifier becomes ON in the region in which the first uplink channel is transmitted, the transient period occurs in the region in which the first uplink channel is transmitted.

Furthermore, as described in the third embodiment part, whether the transient period will be included in any one of the region in which the first uplink channel is transmitted and the region in which the second uplink channel is transmitted may be determined depending on the type of channel, priority, numerology (e.g., subcarrier spacing), the length of a TTI, etc.

General Apparatus to which the Present Invention May be Applied

FIG. 16 illustrates a block diagram of a wireless communication apparatus to which the methods proposed in this specification may be applied.

Referring to FIG. 16, a wireless communication system includes an eNB 1610 and a plurality of UEs 1620 disposed within the eNB (1610) region.

The eNB 1610 includes a processor 1611, memory 1612 and a radio frequency (RF) unit 1613. The processor 1611 implements the functions, processes and/or methods proposed in FIGS. 1 to 15. The layers of a radio interface protocol may be implemented by the processor 1611. The memory 1612 is connected to the processor 1611, and stores a variety of types of information for driving the processor 1611. The RF unit 1613 is connected to the processor 1611 and transmits and/or receives radio signals.

The UE 1620 includes a processor 1621, memory 1622 and an RF unit 1623.

The processor 1621 implements the functions, processes and/or methods proposed in FIGS. 1 to 15. The layers of a radio interface protocol may be implemented by the processor 1621. The memory 1622 is connected to the processor 1621 and stores a variety of types of information for driving the processor 1621. The RF unit 1623 is connected to the processor 1621 and transmits and/or receives radio signals.

The memory 1612, 1622 may be positioned inside or outside the processor 1611, 1621 and may be connected to the processor 1611, 1621 by various well-known means.

For example, in a wireless communication system supporting low latency service, a UE may include a radio frequency (RF) unit for transmitting and receiving radio signals in order to transmit and receive downlink (DL) data and a processor functionally connected to the RF unit.

Furthermore, the eNB 1610 and/or the UE 1620 may have a single antenna or multiple antennas.

FIG. 17 is a block diagram of a communication device according to an embodiment of the present disclosure.

Particularly, FIG. 17 is a diagram illustrating a UE shown in FIG. 16 in more detail.

Referring to FIG. 17, the UE includes a processor (or digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (optional), a speaker 1745 and a microphone 1750. The UE may include a single antenna or multiple antennas.

The processor 1710 may be configured to implement the functions, procedures and/or methods proposed by the present disclosure as described in FIGS. 1 to 15. Layers of a wireless interface protocol may be implemented by the processor 1710.

The memory 1730 is connected to the processor 1710 and stores information related to operations of the processor 1710. The memory 1730 may be located inside or outside the processor and may be connected to the processors through various well-known means.

A user enters instructional information, such as a telephone number, for example, by pushing the buttons of a keypad 1720 or by voice activation using the microphone 1750. The processor receives and processes the instructional information to perform the appropriate function, such as to dial the telephone number. Operational data may be retrieved from the SIM card 1725 or the memory 1730 to perform the function. Furthermore, the processor may display the instructional and operational information on the display 1715 for the user's reference and convenience.

The RF module 1735 is connected to the processor and transmits and/or receives an RF signal. The processor forwards instructional information to the RF module, to initiate communication, for example, transmits radio signals comprising voice communication data. The RF module includes a receiver and a transmitter to receive and transmit radio signals. An antenna 1740 facilitates the transmission and reception of radio signals. Upon receiving radio signals, the RF module may forward and convert the signals to baseband frequency for processing by the processor. The processed signals may be transformed into audible or readable information outputted via the speaker 1745.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The scheme for controlling uplink transmission power in a wireless communication system of the present invention has been illustrated as being applied to the 3GPP LTE/LTE-A system and a 5G system (New RAT system), but may also be applied to various wireless communication systems.

The invention claimed is:

1. A method for a user equipment (UE) to control uplink transmission power in a wireless communication system, the method comprising:
   reporting, to a base station, UE capability information related to uplink transmission power;
   receiving, from the base station, indication information for transmission power of a first uplink channel and indication information for transmission power of a second uplink channel, in response to the reporting;
   transmitting the first uplink channel based on the received transmission power of the first uplink channel; and transmitting the second uplink channel based on the received transmission power of the second uplink channel, consecutively to the transmission of the first uplink channel, wherein a transient period based on a difference between the transmission power of the first uplink channel and the transmission power of the second uplink channel is configured to be included in any one of a first region in which the first uplink channel is transmitted or a second region in which the second uplink channel is transmitted.

2. The method of claim 1,
wherein, if a guard period (GP) is present between the first region in which the first uplink channel is transmitted and the second region in which the second uplink channel is transmitted, the transient period is configured to be included in the guard period.

3. The method of claim 2,
wherein the region in which the transient period is included is determine based on timing where a power amplifier of the UE operates in an ON state or an OFF state.

4. The method of claim 1,
wherein, if the first uplink channel is an uplink data channel and the second uplink channel is a channel related to initial access, the transient period is configured to be included in the second region in which the second uplink channel is transmitted.

5. The method of claim 1,
wherein, if priority of the first uplink channel is higher than priority of the second uplink channel by considering preconfigured priority of uplink channels, the transient period is configured to be included in the second region in which the second uplink channel is transmitted.

6. The method of claim 5,
wherein the preconfigured priority of the uplink channels is configured so that priority of an uplink control channel is higher than priority of an uplink data channel.

7. The method of claim 1,
wherein, if a subcarrier spacing configured for the first uplink channel is larger than a subcarrier spacing configured for the second uplink channel, the transient period is configured to be included in the second region in which the second uplink channel is transmitted.

8. The method of claim 1,
wherein, if a transmission time interval (TTI) for the first region in which the first uplink channel is transmitted is smaller than a TTI for the second region in which the second uplink channel is transmitted, the transient period is configured to be included in the second region in which the second uplink channel is transmitted.

9. The method of claim 1,
wherein the UE capability information related to the uplink transmission power comprises information indicating a tolerable power difference of the UE corresponding to a preconfigured tolerable power transient period.

10. The method of claim 9,
wherein the information indicating the tolerable power difference of the UE comprises information indicating a preconfigured UE category based on the tolerable power difference.

11. The method of claim 1,
wherein the UE capability information related to the uplink transmission power comprises a transient period value required for conversion as much as a preconfigured specific power difference.

12. The method of claim 11,
wherein, if a value for the preconfigured specific power difference is preconfigured as a plurality of values, the UE capability information related to the uplink transmission power comprises an average value of transient period values respectively for the plurality of values.

13. A user equipment controlling uplink transmission power in a wireless communication system, the user equipment comprising:
a transceiver unit for transmitting and receiving radio signals,
a processor functionally connected to the transceiver unit,
wherein the processor is configured to:
report, to a base station, UE capability information related to uplink transmission power;
receive, from the base station, indication information for transmission power of a first uplink channel and indication information for transmission power of a second uplink channel, in response to the reporting;
transmit the first uplink channel based on the received transmission power of the first uplink channel; and
transmit the second uplink channel based on the received transmission power of the second uplink channel, consecutively to the transmission of the first uplink channel, and
wherein a transient period based on a difference between the transmission power of the first uplink channel and the transmission power of the second uplink channel is configured to be included in any one of a first region in which the first uplink channel is transmitted or a second region in which the second uplink channel is transmitted.

* * * * *